3,448,143
DERIVATIVES OF DJENKOLIC ACID
Bernard Marinier, Laval des Rapides, Quebec, Canada, assignor to Frank W. Horner Limited, Mount Royal, Quebec, Canada, a Canadian company
No Drawing. Filed Apr. 19, 1967, Ser. No. 631,873
Int. Cl. C07c 149/20; A61k 27/00
U.S. Cl. 260—481                                        5 Claims

ABSTRACT OF THE DISCLOSURE

A class of compounds derived from djenkolic acid, useful as anti-inflammatory and anti-edema agents. Representative compounds include dicarbobenzoxy djenkolic acid, its alkyl esters and its dihydrazide.

---

The present invention relates to novel compounds derived from djenkolic acid. More particularly, the invention relates to certain novel compounds derived from djenkolic acid which are useful as anti-inflammatory and anti-edema agents.

Djenkolic or jenkolic acid, chemically, (methylene dithio)-3,3'-dialanine, is an amino acid which was originally isolated from djenkol beans in 1935 and which has the following structural formula:

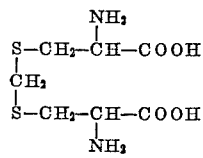

The novel derivatives of the present invention can be described as having the following formula:

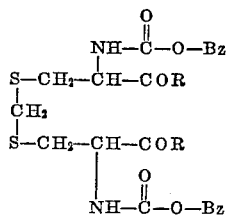

wherein R is hydroxy, lower alkoxy, or hydrazino, and Bz is benzyl. As used herein and in the appended claims, the term "lower alkoxy" signifies an alkoxy radical having from 1 to 6 carbon atoms.

The compounds of the present invention can be conveniently prepared by using djenkolic acid as the starting material.

Dicarbobenzoxy djenkolic acid is obtained by reacting djenkolic acid with about two molar equivalents of carbobenzoxy chloride. The lower alkyl esters of dicarbobenzoxy djenkolic acid are obtained by known esterification procedures, such as, for example, by treating dicarbobenzoxy djenkolic acid with the appropriate alcohol in the presence of an acidic catalyst. Dicarbobenzoxy djenkolyl dihydrazide is conveniently obtained by treating the ester with about two molar equivalents of hydrazine.

The following examples illustrate in detail the preparation of a representative number of compounds of the present invention.

EXAMPLE I

Preparation of dicarbobenzoxy djenkolic acid

There were dissolved 2.54 g. (0.01 mol) of djenkolic acid, prepared according to the method of Armstrong and Du Vigneaud, J. Biol. Chem., 168, 373 (1947), in 25 ml. of 1 N sodium hydroxide.

To the resulting solution, cooled to a temperature of 0° C. and well stirred, there was slowly added, over a period of 30 minutes, 3.4 g. (0.02 mol) of carbobenzoxy chloride. From time to time, 35 ml. of 1 N sodium hydroxide are added to the reaction mixture in small quantities as to maintain said mixture basic to phenolphthalein.

After the additions, the reaction mixture is stirred at 0° C. for about 1.5 hours and then at room temperature for an additional 1.5 hours. The mixture is then acidified to Congo red with concentrated hydrochloric acid and extracted twice with 20 ml. aliquots of ethyl acetate.

The organic extracts are dried over anhydrous sodium sulfate and evaporated to dryness under reduced pressure. The oily residue (5.1 g.) is crystallized from a mixture of tetrahydrofuran and petroleum ether to yield 4.9 g. (49%) of a white solid, M.P. 71–72° C., $[\alpha]_D^{25}$ —73° (C=1, dimethylformamide).

Analysis.—Calculated (for $C_{23}H_{26}N_2O_8S_2$): C, 52.86; H, 5.01; N, 5.36; S, 12.27. Found: C, 52.60; H, 5.25; N, 5.53; S, 12.35.

EXAMPLE II

Preparation of dicarbobenzoxy-diethyl djenkolate

To a solution of 3.64 g. of dicarbobenzoxy djenkolic acid in 10 ml. of absolute ethanol, there is added 10 ml. of absolute ethanol saturated with dry hydrogen chloride. The resulting solution is allowed to stand for 23 hours during which time a portion of the product crystallizes from solution.

The solvent is removed under reduced pressure and the solid residue is crystallized from absolute alcohol. There is thus obtained 3.0 g. (75%) of crystals, M.P. 87–88° C., $[\alpha]_D^{25}$ —61° (C=1, dimethylformamide).

EXAMPLE III

Preparation of dicarbobenzoxy djenkolyl dihydrazide

Dicarbobenzoxy diethyl djenkolate (1.156 g., 0.002 mol) is disolved with warming in 8 ml. of absolute ethanol.

To the warm solution there is added 0.68 ml. (5 molar equivalents) of 95% hydrazine. The solution is allowed to stand at room temperature and, after about one hour, the dihydrazide begins to precipitate. After 20 hours, the precipitate is removed by filtration. Yield: 1.1 g. (100%) of product, M.P. 157–159° C.

Recrystallization from absolute ethanol yield 0.9 g. (82%), M.P. 159–161° C., $[\alpha]_D^{25}$ —44° (C=1, dimethylformamide).

Analysis.—Calculated (for $C_{23}H_{30}N_6O\ S_2$): C, 50.18; H, 5.49; N, 15.26; S, 11.64. Found: C, 50.33; H, 5.60; N, 15.53; S, 11.93.

As indicated hereinbefore the compounds of the invention possess valuable anti-inflammatory and anti-edema activity.

The anti-inflammatory activity of representative compounds was determined by the cotton pellet granuloma test.

Albino rats, 27 to 30 days old, were bilaterally adrenalectomized under ether anesthesia (day one) and two sterile cotton balls, each weighing 5±1 mg., were inserted subcutaneously in each test animal. From the time of surgery, the test animals were maintained on a commercial complete diet, but 0.9% saline was substituted for drinking water.

The test compounds were administered on the second, third and fourth day suspended in a 1% Tween solution. Controls received the same volume of 1% Tween solution minus the test compound.

In the afternoon of the fifth day, the test animals were sacrificed with chloroform and the granuloma surrounding the cotton pellets was removed, dried at 37° C. for four days and weighed. The dry granuloma weight was obtained by difference from the original dry weight.

The pooled results are set forth in Table I, which follows:

TABLE I.—ANTI-INFLAMMATORY ACTIVITY

| Compound | Dose (mg./kg.) | Route of administration | Number of pellets | Weight of granuloma (mg.) (±standard deviation) |
|---|---|---|---|---|
| None | | Subcutaneous | 250 | 11.7±3.6 |
| Dicarbobenzoxydiethyl djenkolate. | 25 | do | 10 | 8.0±1.5 |
| Do | 50 | do | 10 | 7.8±2.1 |
| Do | 300 | Oral | 20 | 8.5±2.6 |
| Dicarbobenzoxy djenkolyl dihydrazide. | 50 | Subcutaneous | 12 | 6.6±1.2 |
| Do | 500 | Oral | 8 | 7.1±1.7 |

As is apparent from the results set forth hereinbefore, the compounds of the invention show significant anti-inflammatory activity.

The anti-edema activity was determined by the compounds' ability to reduce edema produced in the paws of rats by the injection of dextran.

Rats weighing from 120 to 200 grams were used. A standard volume of 0.05 ml. of dextran (6% w./v. in saline) was injected into the plantar region of the right hind paw as the edema producing agent.

The test materials were administered as solutions or suspension in 1% Tween 80 thirty minutes before the injection of dextran.

Measurements of the edema were made according to the method described by Adamkiewicz et al. (Can. J. Biochem Physiol., 33:332, 1955). An initial measurement of the volume of each paw was made before the injection of dextran and became the basis for the evaluation of the development of the edema at the subsequent measurements made at two hours (peak time for the edema) and five hours (end of the experiment). The volume difference between the inflamed paws and the same paw prior to the dextran injection was taken to represent the volume of the edema.

The pooled results are set forth in Table II, which follows:

TABLE II.—ANTI-EDEMA ACTIVITY

| Compound | Dose (mg./kg.) | Route of administration | Number of animals | Volume of the edema (ml.) (±standard deviation) | |
|---|---|---|---|---|---|
| | | | | 2 hours | 5 hours |
| None (controls) | | | 49 | .71±.14 | .50±.15 |
| Dicarbobenzoxy-diethyl djenkolate. | 200 | Intraperitoneal | 5 | .39±.20 | .17±.15 |
| Do | 500 | Oral | 5 | .61±.06 | .37±.05 |
| Dicarbobenzoxy djenkolyl di-hydrazide. | 100 | Intraperitoneal | 5 | .48±.18 | .30±.18 |
| Do | 200 | do | 5 | .36±.15 | .14±.11 |

As is apparent from the results in the above table, the compounds of the invention are effective in reducing edema to a significant degree.

The compounds of the present invention are nontoxic in amounts required to effect sufficient reduction of inflammation and edema.

In general, while it is possible to administer the active ingredients of the present invention as pure compounds, it is preferred to incorporate said active ingredients with a suitable pharmaceutical carrier.

The preferred mode of administration is by oral route, with the active ingredient in the form of tablets or capsules. Suitable solid pharmaceutical carriers useful in the preparation of such tablets or capsules include, for example, starch, lactose, sucrose, glucose, gelatin, and the like.

The active ingredients of the invention in their free form can also be dissolved in a liquid pharmaceutical carrier, such as, for example, propylene glycol, polyethylene glycol, water, saline, and mixtures thereof, to form a solution suitable for administration by injection or for oral administration in a palatable form.

Unit dosage forms, such as tablets, capsules or injectable solutions, can contain any suitable predetermined amount of one or more of the active ingredients and may be administered as desired. Solid unit dosage forms generally contain from about 25 to about 95% by weight of one or more of the active ingredients. Liquid dosage forms generally contain from about 0.1 gram to about 90 grams of active ingredients per 100 ml. of solution. An effective single dose of the active ingredient is generally in the range of 25 to 1000 mg.

Although the invention has been illustrated by the preceding examples and tables, it is not to be construed as being limited thereby. Various departures may be made therefrom within the scope of the accompanying claims without departing from the principles of the invention.

What is claimed is:

1. A compound of the formula:

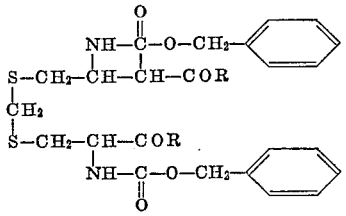

wherein R is hydroxy, lower alkoxy, or hydrazino.

2. The compound of claim 1 wherein R is hydroxy.
3. The compound of claim 1 wherein R is lower alkoxy.
4. The compound of claim 3 wherein R is ethoxy.
5. The compound of claim 1 wherein R is hydrazino.

References Cited

Armstrong et al., J. Biol. Chem. 168, 373 (1947).

JAMES A. PATTEN, *Primary Examiner.*

E. GLEIMAN, *Assistant Examiner.*

U.S. Cl. X.R.

424—300